May 3, 1960 R. RABIN ET AL 2,935,609
PRE-TRIGGER GENERATOR
Filed Aug. 21, 1957
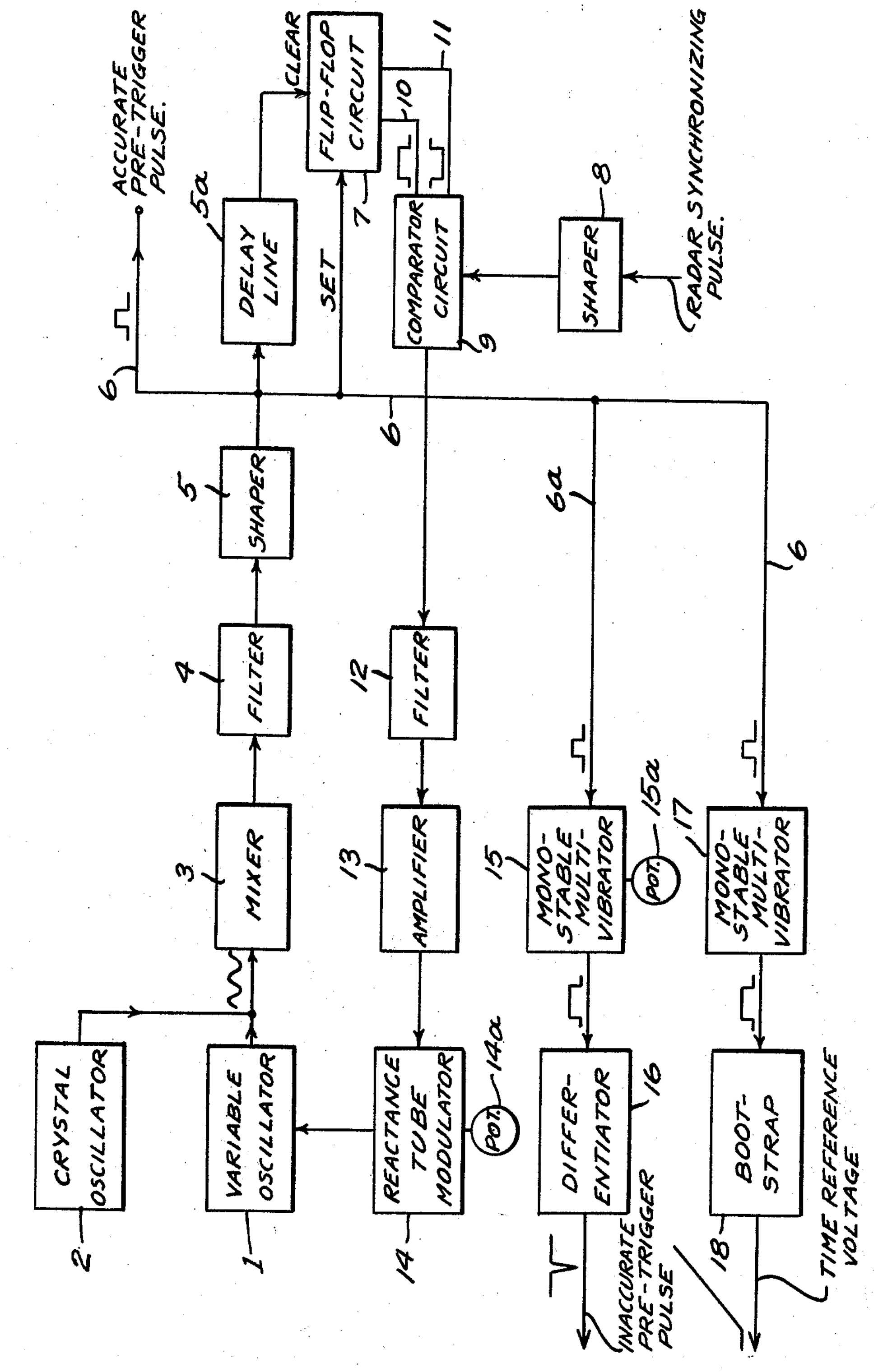

United States Patent Office 2,935,609

Patented May 3, 1960

2,935,609

PRE-TRIGGER GENERATOR

Richard Rabin, Stamford, Conn., and Kurt Merl, Bronx County, N.Y., assignors to Sperry Rand Corporation, Ford Instrument Company Division, Long Island City, N.Y., a corporation of Delaware Application August 21, 1957, Serial No. 679,426

6 Claims. (Cl. 250—27)

This invention relates to a system for generating pulses in response to signals from radar or other timer devices and particularly to a pre-trigger generator which accurately furnishes a pulse having the same characteristics as a standard, comparison pulse except for a predetermined displacement or separation therefrom. The system furnishes means for generating an accurate pre-trigger pulse which may be used as a reference for other desired wave forms. For example, a "timing reference" wave may be produced as by a bootstrap and mono-stable multivibrator circuit or an "inaccurate" pre-trigger pulse may be made available to associated components of the system, such as a programmer, by means of a multivibrator and differential circuit.

These other wave forms are dependent upon the accurate generation of a pulse which has a preselected separation from a standard pulse and it is the general object of the invention to provide means for such generation. In general, this object is accomplished by the provision of means for generating and feeding a pulse of the desired repetition rate to a delay line equal to the amount of pre-trigger time separation specified for the chosen mode of operation. Additionally, means are provided for comparing the output of the delay line with a standard timer pulse and for feeding the output back to the generator whose output phase is shifted until coincidence occurs in the comparing means. The input to the delay line then serves as the accurate pre-trigger pulse.

A more complete understanding of the invention may be obtained from the following description taken in conjunction with the drawing which is a block diagram of the frequency control system and associated wave forming components.

Assuming the standard or timer pulse oscillation is within a range of 290–420 cycles per second, a variable oscillator 1 operating at a frequency of thirty kilocycles plus the frequency of the desired pulse repetition, and a crystal controlled oscillator 2 operating at a frequency of thirty kilocycles feed their output to a mixer 3 and the output of the mixer 3 is placed in a filter 4 which eliminates the sum frequency of the mixer leaving a sinusodial signal of the desired repetition frequency.

The filter output is fed to a shaper 5 which shapes the sinusoidal wave form to meet the requirements of the pre-trigger pulse. The pre-trigger pulse is then applied to an accurate, lumped constant delay line $5^a$ and is taken off output line 6 to set a standard flip-flop circuit 7 which is cleared by the delayed pre-trigger pulse furnished by the delay line $5^a$.

A timer pulse, which might be the synchronizing pulse supplied by a radar, is standardized with respect to the pre-trigger pulse wave form by means of a shaper 8 and applied to the grids of the tubes of comparator circuit 9. The comparator circuit is similar to that used in radar equipment for automatic tracking purposes. The dual output on leads 10 and 11 from the plates of the flip-flop is applied to the plates of the tubes in the comparator circuit. The D.C. output of the comparator will have one polarity if the radar synchronizing pulse leads the delayed pre-trigger pulse, and will have the opposite polarity if it lags it by virtue of the set or clear condition of flip-flop circuit 7. Zero output is produced if coincidence occurs which would be the case if the pre-trigger pulse is generated precisely at the correct desired separation set by the delay line.

Where there is lack of coincidence in the comparator circuit, its output is filtered for the proper response time constant by filter 12, amplified by amplifier 13 and applied as a control signal to reactance tube modulator 14 which shifts the phase, i.e. frequency, of the variable oscillator 1 by virtue of its connection therewith until coincidence is obtained in the comparator unit. The reactance tube 14 is manually adjustable by a potentiometer $14^a$ in the modulator box.

Having obtained the accurate pre-trigger pulse, it can serve as the timing reference for the other desired wave forms. For example, an inaccurate pre-trigger pulse having a desired separate phase from the accurate pre-trigger pulse may be generated by triggering a mono-stable multivibrator 15 connected to the output line by a lead $6^a$, a differentiator 16 being employed to differentiate the trailing edge of the multivibrator output. The multivibrator 15 is adjustable by a potentiometer $15^a$. Additionally, a mono-stable multivibrator 17 may be provided in the output line 6 to gate a boot-strap sweep circuit 18 to produce a "timing reference" in a sawtooth waveform.

There are, of course, many types of wave mixing systems other than the one indicated herein which would serve to furnish an adjustably controlled frequency to the delay line. In fact, it is understood that various modifications in the invention may be effected by persons skilled in the art without departing from the skill and scope of the invention as claimed in the appended claims.

What is claimed is:

1. A system comprising a variable frequency generator, said generator consisting of an oscillator of given frequency, a second oscillator having a variably controlled separate frequency from the first-mentioned oscillator selected according to the frequency of the timer pulse, a mixer for combining the output of the two oscillators and a filter connected to the mixer for eliminating the sum frequency of its output, a delay line connected to said generator, a phase comparator capable of yielding a D.C. output, the polarity of which is dependent on the relative phase of its two inputs, said phase comparator being connected to said delay line to receive one input therefrom, means for introducing to said phase comparator a timer pulse as a second input thereto, and feed back means connecting said comparator to said oscillator for adjusting the frequency of the variable oscillator until the phase of the timer pulse and the output of the delay line are coincident and a flip-flop circuit is provided in the connection of said delay line and said comparator, said flip-flop circuit being in setting connection with the generator.

2. A system as claimed in claim 1 wherein a shaper unit is provided between the generator and said delay line.

3. A system as claimed in claim 2 wherein a second shaper is connected into the input side of the comparator adapted to receive said timer pulse.

4. A system as claimed in claim 3 wherein said feed back means which is connected to said second oscillator from the comparator consists of a filter, amplifier and a reactance tube modulator.

5. A system as claimed in claim 4 wherein a multivibrator is connected to the output of said first-mentioned shaper and a differentiator is connected to said multivibrator for differentiating the output thereof, whereby there is produced an inaccurate pre-trigger pulse related to the accurate pre-trigger pulse of the first-mentioned shaper.

6. A system as claimed in claim 5 wherein a second multivibrator is connected to the first-mentioned shaper and a bootstrap is connected to the second multivibrator, whereby the system is adapted to yield a timing reference voltage triggered by the accurate pre-trigger pulse of said first-mentioned shaper.

References Cited in the file of this patent

UNITED STATES PATENTS

| | | |
|---|---|---|
| 2,065,565 | Crosby | Dec. 29, 1936 |
| 2,256,083 | George | Sept. 16, 1941 |
| 2,459,131 | Mesner | Jan. 11, 1949 |
| 2,558,100 | Rambo | June 26, 1951 |
| 2,561,182 | Crane | July 17, 1951 |
| 2,595,608 | Robinson et al. | May 6, 1952 |
| 2,696,601 | Hilburn | Dec. 7, 1954 |
| 2,702,852 | Briggs | Feb. 22, 1955 |
| 2,760,189 | McCoy et al. | Aug. 21, 1956 |